(12) United States Patent
Maver (10) Patent No.: US 7,506,577 B2
(45) Date of Patent: Mar. 24, 2009

(54) MACHINE FOR DISPENSING BEVERAGES FROM PODS

(75) Inventor: Assunto Marino Maver, Ghisalba (IT)

(73) Assignee: MAVER S.r.L., Cologno al Serio (IT)

( * ) Notice: Subject to any disclaimer, the term of this patent is extended or adjusted under 35 U.S.C. 154(b) by 546 days.

(21) Appl. No.: 11/176,186

(22) Filed: Jul. 8, 2005

(65) Prior Publication Data

US 2006/0037482 A1 Feb. 23, 2006

(30) Foreign Application Priority Data

Aug. 17, 2004 (IT) .......................... MI2004A1653

(51) Int. Cl.
*A47J 31/34* (2006.01)
(52) U.S. Cl. ........................ 99/289 R; 99/295; 99/302 P
(58) Field of Classification Search ............... 99/289 R, 99/289 D, 302 P, 295, 293, 290, 302 R
See application file for complete search history.

(56) References Cited

U.S. PATENT DOCUMENTS

| | | | | |
|---|---|---|---|---|
| 3,181,734 A | * | 5/1965 | Ensign | ...................... 222/83.5 |
| 3,209,676 A | * | 10/1965 | Zimmermann et al. | .... 99/289 R |
| 4,470,999 A | * | 9/1984 | Carpiac | ....................... 426/506 |
| 5,134,924 A | * | 8/1992 | Vicker | ........................... 99/280 |
| 5,875,703 A | * | 3/1999 | Rolfes | .......................... 99/283 |
| 6,857,352 B2 | * | 2/2005 | Fischer | ......................... 99/280 |
| 7,024,985 B2 | * | 4/2006 | Park | .......................... 99/302 P |
| 7,069,837 B2 | * | 7/2006 | Sachtleben | .................... 99/295 |

FOREIGN PATENT DOCUMENTS

IT   BG2000A00030   2/2002

* cited by examiner

*Primary Examiner*—Reginald L Alexander
(74) *Attorney, Agent, or Firm*—Connolly Bove Lodge & Hutz LLP (57) ABSTRACT

This invention relates to a machine for dispensing beverages, e.g. tea or coffee, the operation of which is subject to the use of prepackaged one-cup pods. The machine (1) according to the invention comprises a revolving member (10), complete with a seat (13) for containing a pod, which cooperates with a hook (20), and a water heating and delivery unit (20) including a one-way flow valve (60) which is opened when a given pressure is exceeded. The water heating and delivery unit (30) is driven by an operating unit (50) to compress said pod when the revolving member (10) occupies the working position for the preparation and delivery of a beverage. The revolving member (10) subsequently completes a turn during which the pod contained in the seat (13) is removed by means of the hook (20).

22 Claims, 6 Drawing Sheets

MACHINE FOR DISPENSING BEVERAGES FROM PODS

DESCRIPTION

The present invention relates to a machine for dispensing beverages, e.g. tea, coffee, chamomile tea or soup, that is used with prepackaged pods containing the substances needed to generate the beverage by infusion.

It is common knowledge that the machines conventionally used for dispensing hot drinks from pods consist of an infusion chamber designed to contain a prepackaged pod through which hot water is delivered under pressure by a dispenser unit. The water is heated by a boiler operationally connected to the dispenser unit and powered by an electric pump connected to a water storage tank. The hot beverage coming from the infusion chamber is conveyed towards the delivery spout for collection in suitable containers.

In this type of machine, each pod makes one cup so it has to be replaced each time a beverage is dispensed. In many cases, changing the pod demands a further manual action by the user; in other solutions available on the market, this is done by automatic systems, that still pose considerable problems in terms of reliability, however. Said extraction systems are also composed of a considerable number of components whose mutual arrangement makes the extraction process rather difficult, consequently restricting its reliability to a limited number of deliveries.

Another drawback characteristic of currently-available machines is related to their scarce flexibility of operation in terms of using different types of pod. In fact, it is common knowledge that the pods on the market differ in compactness, density, and infusion pressure, depending on the type of beverage to obtain. For instance, the pods used for dispensing "American-style" coffee, are known to be less compact and demand a lower infusion pressure than those used for dispensing the espresso coffee normally drunk in European countries. A further difference lies in the consistency and density characteristics of the pods used to prepare a cup of tea.

The dispenser systems in current use do not provide for any automatic adjustment of the infusion pressure to suit the type of pod being used. This limitation imposes the need to manufacture different types of machine to suit the market for which the machines are intended, with obvious problems in terms of productivity and production costs.

Given the above considerations, the principal goal of the present invention is to provide a machine for preparing a beverage from a one-cup disposable pod that enables the above-mentioned drawbacks to be overcome.

In the context of said goal, one object of the present invention is to provide a machine for automatically preparing a beverage from a one-cup pod that is complete with a reliable mechanism for automatically discharging the used pod consisting of a limited number of easily assembled components.

Another object of the present invention is to provide a machine for automatically preparing a beverage from a one-cup pod that is functionally flexible in relation to the use of different types of pod.

A further, not necessarily last object of the present invention is to provide a machine for automatically preparing a beverage that is highly reliable and relatively easy to manufacture at competitive costs.

Said goals, and the above-stated and any other objects that will emerge later on, are combined in a machine for automatically preparing a beverage according to the description in claim 1. The main advantage of the invention lies in its particular feature of combining, in the same machine, an automatic mechanism for discharging the used pod, made using a limited number of components, with a water heating and delivery unit that enables an automatic adjustment of the infusion pressure to suit the type of pod being used.

Further characteristics and advantages of the invention will become more clear from the description of preferred, but non-exclusive, embodiments of the machine for the automatic preparation of a beverage according to the invention, as illustrated by way of the non-restrictive example in the attached drawings, wherein.

With reference to the above-mentioned figures, the machine 1 for preparing a beverage from a one-cup pod according to the invention comprises a frame mainly composed of a first 25 and a second shoulder 26 mutually arranged so as to be substantially parallel for the purpose of supporting a revolving member 10 having a seat 13 for containing the pod, a hook 20, a water heating and delivery unit 30, complete with a one-way flow valve 50 for controlling said water heating and delivery unit 30.

Figure 1:
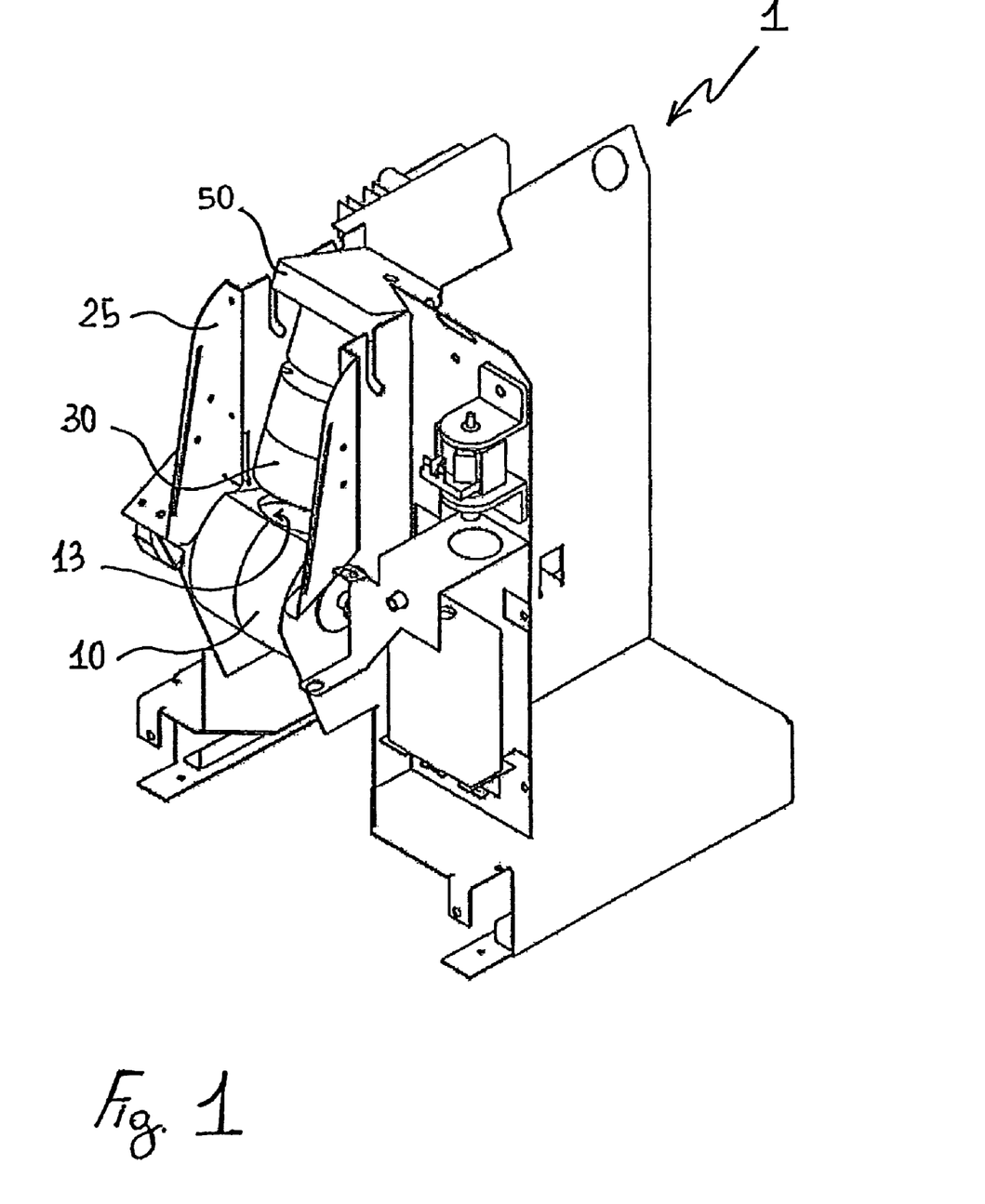
FIG. 1 is a first front view of an embodiment of a set of components relating to a machine for preparing a beverage according to the invention.
Figure 1A:
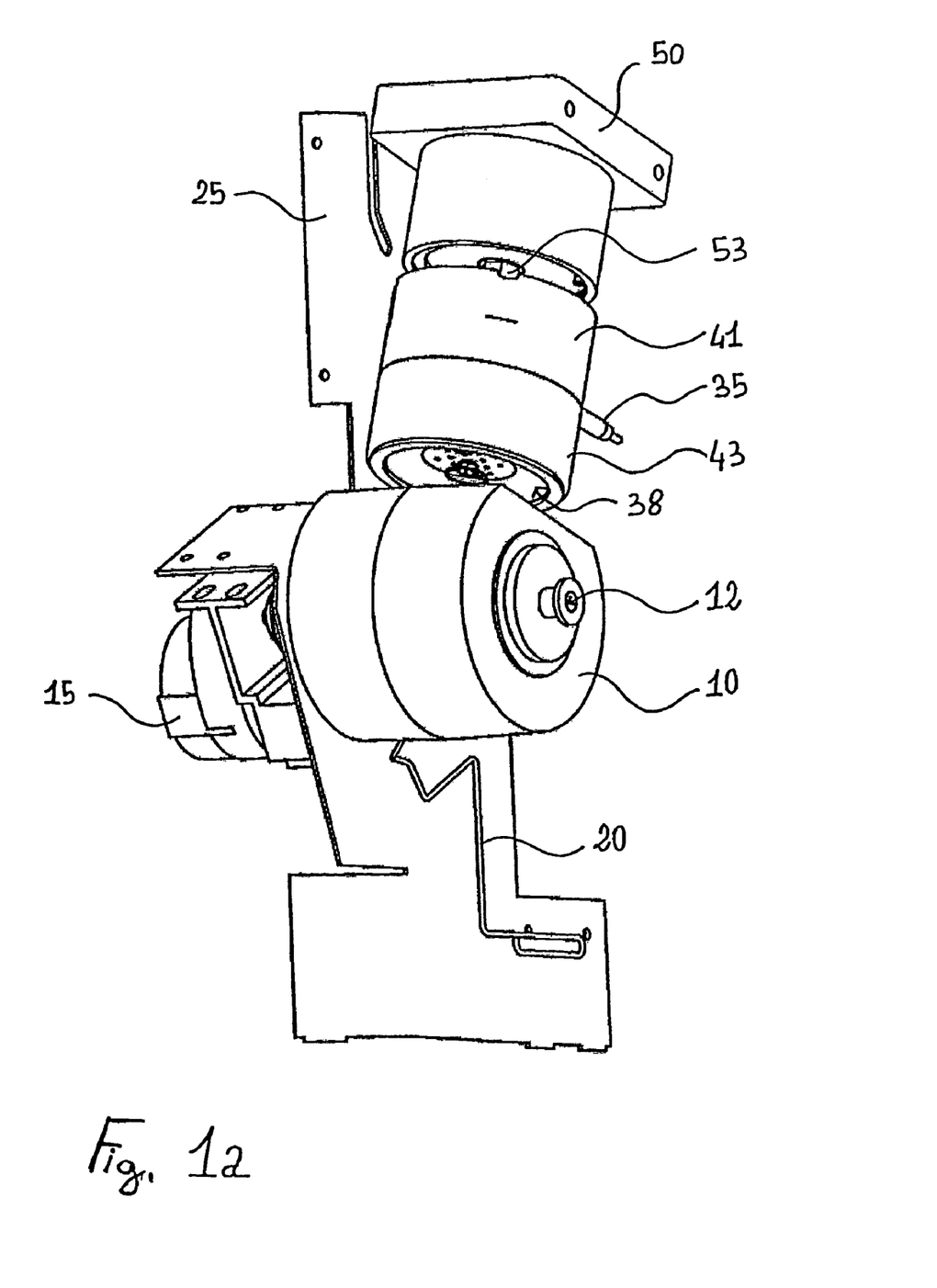
FIG. 1a is a second front view of a revolving member, a hook, a water heating and delivery unit and a unit for operating the machine according to the invention as illustrated in FIG. 1.

With reference, in particular, to FIGS. 1 and 1a, the revolving member 10, which consists, for instance, of a cylindrical drum, occupies a working position during the preparation and dispensing of the beverage in which the water heating and delivery unit 30 compresses the pod due to the effect of the operating unit 50. The revolving member 10 also completes a revolving movement to discharge said pod in cooperation with the hook 20.

According to a preferred embodiment of the invention, the revolving member 10 includes a flat area 11, containing a seat 13, which may be advantageously integrated with a filter (not shown in the figures), on which the one-cup pod needed to prepare the beverage is placed. An internal channel 12 places the seat 13 and the corresponding filter in communication with the external delivery spout (not shown in the figures) for the purpose of pouring the beverage obtained into suitable containers, which may, for instance, be cups or beakers.

The revolving member 10 is turned by means of a geared motor 15, which is also supported by one of said supporting shoulders 25 or 26 in a position adjacent to the revolving member 10. The geared motor 15 is activated before and after the preparation of a beverage according to a working cycle described below.

With reference in particular to FIG. 1, the hook 20 preferably consists of a harpoon spring connected at one first end 21 to the first 25 and/or second 26 supporting shoulder, while the other, free end 22 extends towards said first revolving element 10 for the purpose of engaging the pod. The free end 22 essentially collects the pod from the seat 13 as the revolving member 10 turns, letting it drop into a tray underneath that is inserted in the machine's frame.

As already mentioned above, the machine 1 is characterized in that it comprises a water heating and delivery unit 30, which is driven by the operating unit 50, operationally connected thereto in order to compress the pod when the revolving member 10 occupies the working position arrangement.

Figure 2:
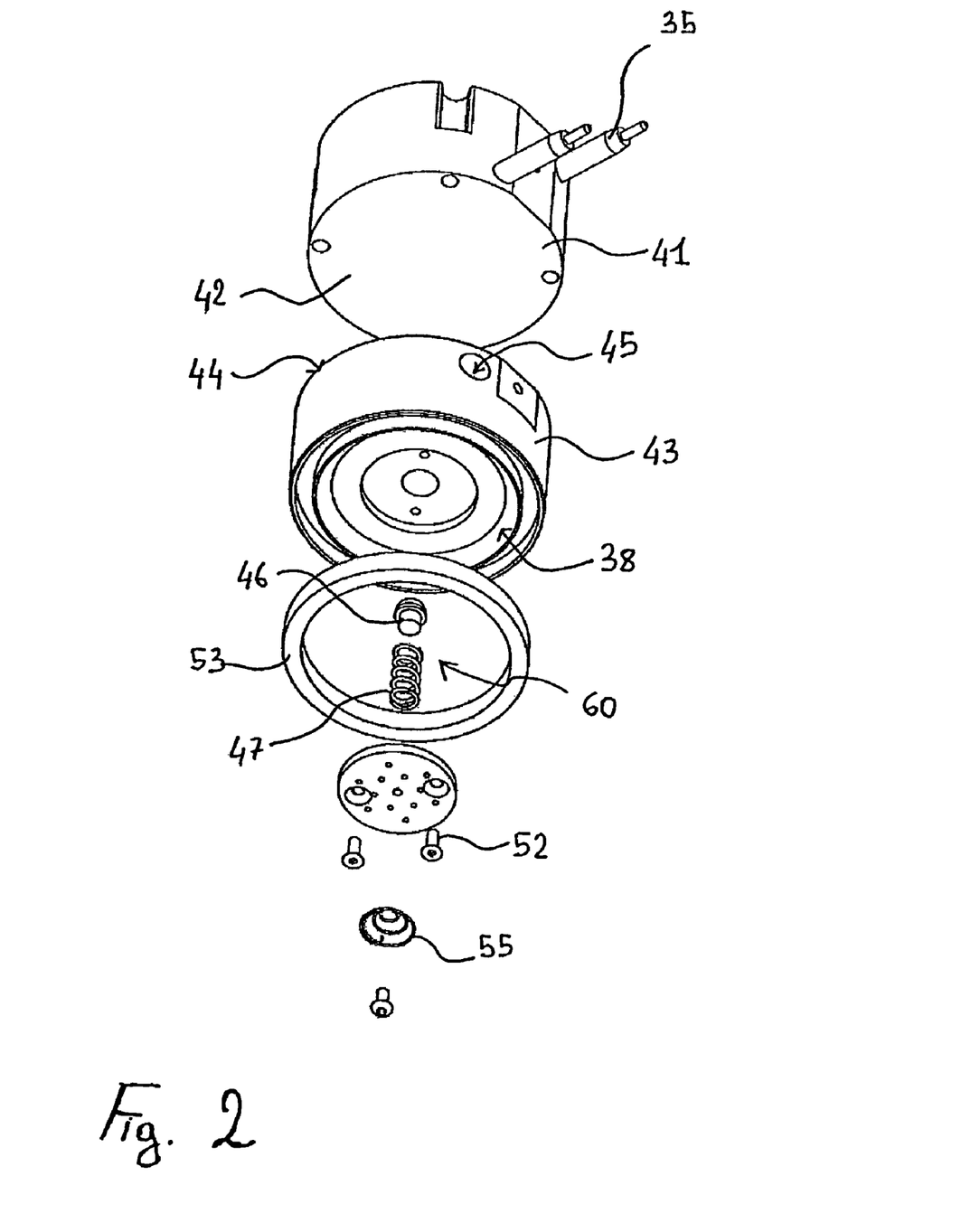
FIG. 2 is an exploded view of a water heating and delivery unit for the machine for preparing a beverage according to the invention.

According to a preferred embodiment of the invention, illustrated in FIG. 2, the operating unit 50 comprises a piston contained inside a corresponding cylinder 52 supported by said first 25 and said second 26 shoulder in a raised position with respect to said revolving member 10. The piston according to the invention consists of at least one stem 53 for driving said water heating and delivery unit 30 in order to enable the latter's movement from a first resting position to a second working position for the preparation and delivery of the beverage. The piston is preferably a single-acting type comprising elastic return means designed to favor its return to the resting position after the beverage has been prepared and dispensed.

On this point, the invention also involves the use of an end-of-stroke sensor, which detects the reaching of said position. Said end-of-stroke sensor sends an electrical consent signal to a microswitch 33 operationally connected to the geared motor 15, the operation of which enables the completion of said rotational movement of the revolving member 10.

FIG. 2 relates to a possible embodiment of the water heating and delivery unit 30 according to the invention. In particular, it comprises a first heating part 41 stably coupled to a second delivery part 43 by means of suitable connection means, such as fixing brackets. The first 41 and second 43 parts respectively include a first surface 42 and a second surface 44, which are brought into mutual contact with one another for the purpose of facilitating the heat exchange.

The second delivery part 43 has a shaped base 38 which comes into contact, during the preparation of the beverage, with the flat plate 11 in said revolving organ 10 when the latter occupies the working position in order to prepare the beverage. An infusion chamber is thus substantially created in the vicinity of the seat 13, in which the pod is positioned.

The second delivery part 43 comprises suitable inlets 45, to which water is delivered by pumping means 40 operationally connected to a storage tank 4. The inlets 45 are connected to a series of grooves forming a labyrinth (not shown in the figures) on said second surface 44, along which the water is obliged to pass. The first heating part 41, on the other hand, consists of electric means 35 which are connected to a power supply for the purpose of heating the water. In fact, the heat generated by the passage of the electric current in the first part 41 is transferred to the water via said first lower surface 42 thereby heating the water.

That is why, according to the invention, the two parts comprising the water heating and delivery unit 30 are advantageously made of a good conductor material, such as aluminium. The pumping means 40, comprising one or more electric pumps 31 and 31a, for instance, can also be advantageously connected to the operating unit 50 for the purpose of supplying the fluid needed to move the piston, i.e. the water heating and delivery unit 30. On this point, the connection between these two latter parts may be achieved by connecting the stem 53 of said piston to said first heating part 41 by means, for instance, of a threaded male-female screw connection.

The heating and delivery unit 30, according to the invention, is characterized in that it comprises a one-way flow valve 60 associated with said second delivery part 43. Said valve 60 preferably consists of a shutter 46, which is supported by a first spring 47 resting on a plate 48 and stably connected to the shaped base 38 in said second part 43. When the one-way valve 60 is in the closed position, the shutter 46 prevents the flow of hot water from said labyrinth of grooves towards said pod. The valve in question is opened when the pressure of the hot water coming to bear on the shutter 46 exceeds a value sufficient to overcome the resistance opposed by the first spring 47. The water consequently flows through the openings 49 in the plate 48 and thus comes into contact with the pod. The plate 48 can be connected to the shaped base 38 by conventional fixing means, such as tap bolts 52.

According to a preferred embodiment of the invention, a second spring 55 is associated with said plate 48 so as to come between the latter and the pod when the beverage is being prepared and dispensed. The elastic pressure of the second spring 55, e.g. a helical spring, facilitates the detachment of the pod from the shaped base 38 of the water heating and delivery unit 30, thus counteracting any tendency of the two parts to adhere to one another.

The second part 43 advantageously also comprises a sealing ring 53 associated with said shaped base 38 in order to seal the infusion chamber created by said shaped base 38, the seat 13 and the flat part 11 of said revolving member 10 during the delivery of the beverage.

Figure 3:
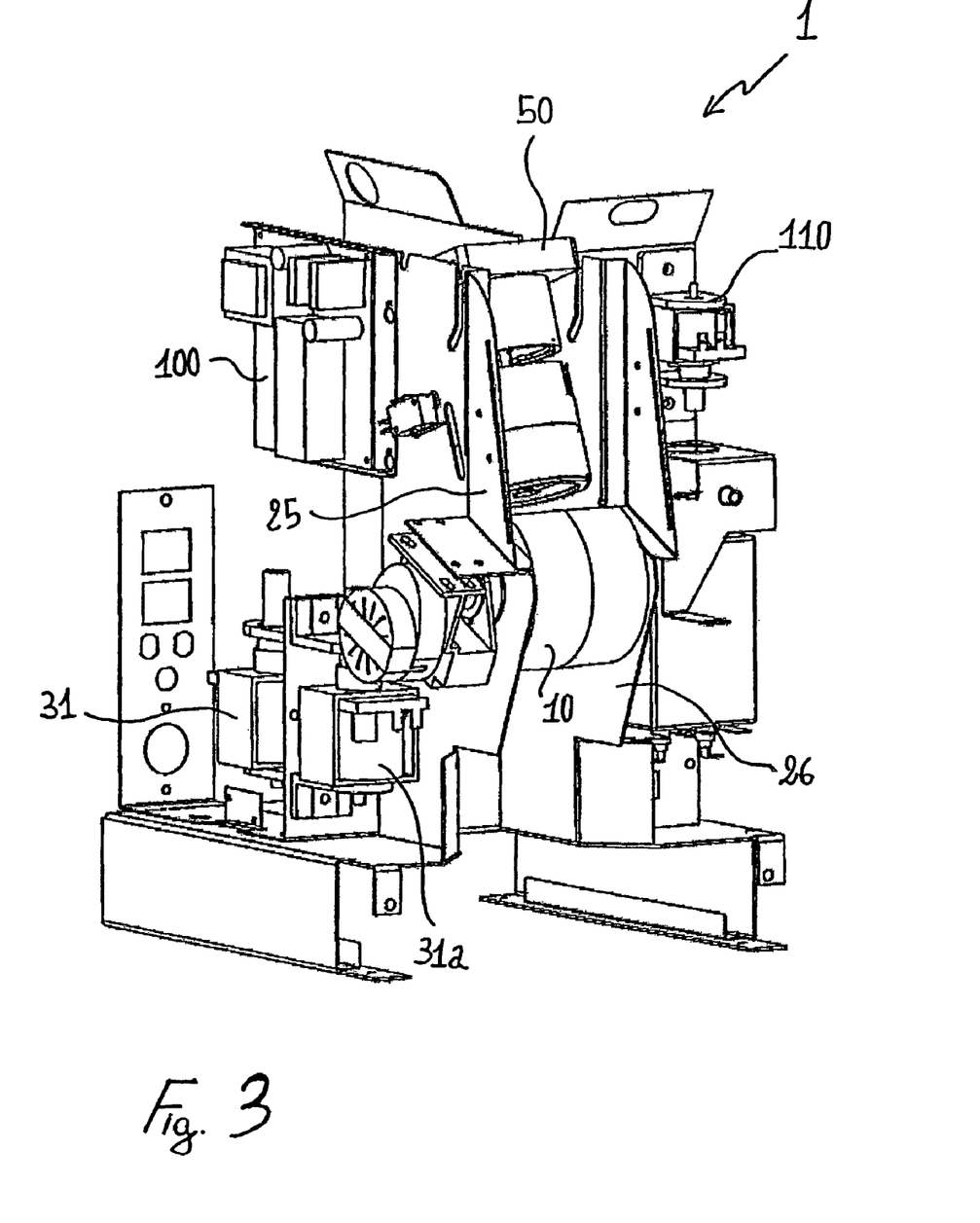
FIGS. 3 and 3a respectively are a first and a second overall view of an embodiment of the machine for preparing a beverage according to the invention.
Figure 3A:
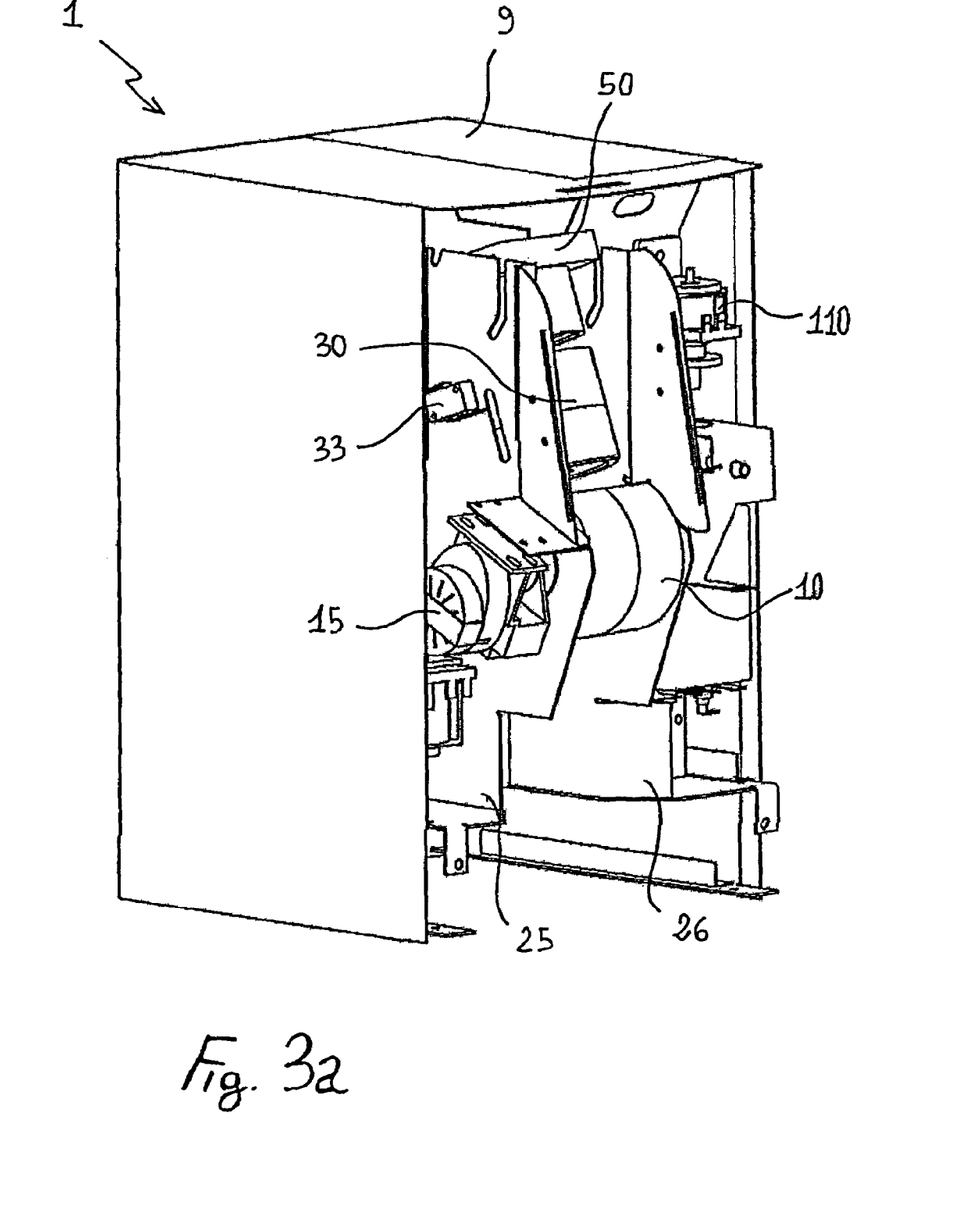

FIGS. 3 and 3a are front views that illustrate other components of the machine 1 for dispensing beverages according to the invention. Inside an outer containment casing 9, the machine includes a control unit 100, which is used to control and program the electronic parts of the machine 1, some of which have already been described, such as the geared motor 15, the microswitch 33 and the pumping means 40 consisting of the electric pumps 31 and 31a.

A first discharge solenoid valve 80, e.g. a three-way and two-position valve, is used to enable the delivery of the water to the operating unit 50. Said valve 80 is excited by means of said control unit 100 and is operationally connected between said pumping means 40 and said water storage tank 4.

According to a preferred embodiment of the invention, the machine 1 also has a flow meter 85, the inlet of which is operationally connected to said tank 4 and its outlet to said pumping means 40. The flow meter 85 provides information to said control unit 100 relating to the quantity of water pumped from the tank 4.

For the delivery of abundant doses of beverage—as required, for instance, to prepare an "American-style" coffee, the machine 1 according to the invention can be integrated with a preheater 70, with its inlet connected to said pumping means 40 and its outlet to said water heating and delivery unit 30. Using this solution, this latter unit is able to warm all the water required evenly because a lesser heat energy is needed than would be required to obtain the same result without any preheating.

According to a preferred embodiment of the invention, the machine 1 also has a hot water tapping unit 90, which is operationally connected to said water heating and delivery unit 30. The tapping unit enables hot water to be drawn off at a pressure substantially corresponding to the one that opens said one-way flow valve 60, and is based on a second solenoid valve 92 energized by said control unit 100 when prompted to do so by the user.

In a further embodiment of the invention, the machine 1 comprises an automatic device for connecting said tank 4 to the water mains for the purpose of ensuring a continuous water supply. The device preferably includes a third service solenoid valve 95, operationally connected to the water mains 96 and enabled by means of a signal sent by one or more sensors positioned inside said tank 4. In particular, said last valve 95 is opened when the water level in the tank 4 drops below or rises above an established minimum or maximum level.

The machine 1 according to the invention can advantageously also include a micropump 110 suitable for drawing water from said tank 4 to feed a steam generator 115 normally used to create a foam in the beverage being dispensed.

Figure 4:
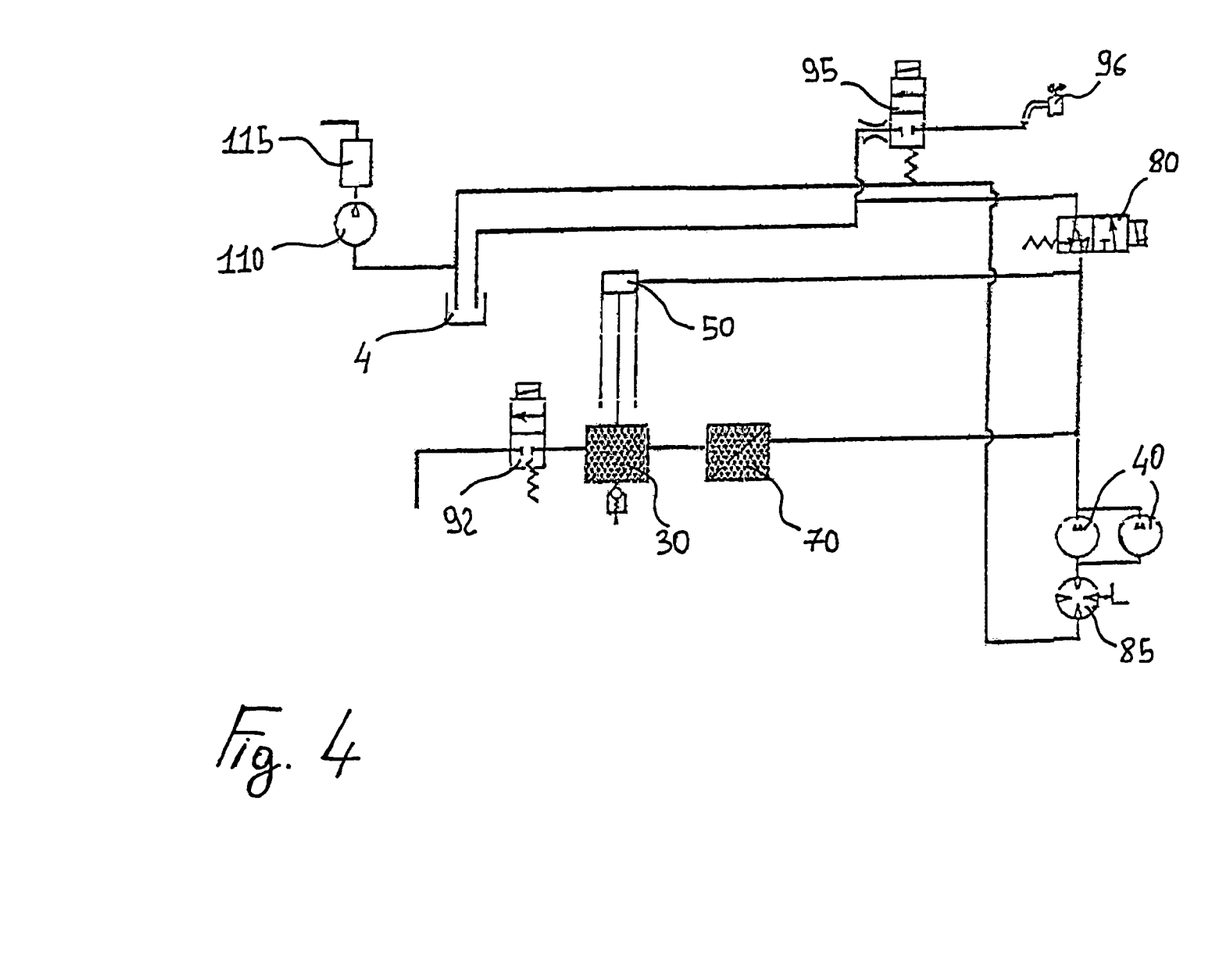
FIG. 4 is a schematic view of a hydraulic circuit in a machine for preparing a beverage according to the invention.

FIG. 4 relates to a possible embodiment of a hydraulic circuit for a machine 1 for dispensing beverages according to the invention and is given for reference in combination with the explanation of how the machine in question functions.

After positioning the pod in the seat 13 created in said first revolving member 10, the user enables the machine to prepare the beverage, e.g. by means of a pushbutton connected to the control unit 100. The latter makes the geared motor 15 turn the revolving member 10 at a pre-established angle so as to enable it to occupy the established working position i.e. to bring the pod into position underneath said water heating and delivery unit 30. Then the pumping means 40 deliver water under pressure to the heating and delivery unit 30, which heats the water. As explained previously, this passage may also include an intermediate heating stage, using the above-mentioned preheater 70.

At the same time, the pumping means 40 power the operating unit 50, thus enabling the movement of the water heating and delivery unit 30 towards the revolving member 10 in order to compress the pod. The shaped base 38 comes into contact with the flat area 11 on the first revolving member 10, creating the infusion chamber containing the pod. When the pressure of the water in the heating and delivery unit 30 exceeds the established threshold, e.g. 0.3 bar, the one-way flow valve 60 opens to enable the hot water to flow through said pod. But the hot water in contact with the pod only passes through the latter if the pressure exceeds a value characteristic of the type of pod being used. The pumping means 40 consequently raise the pressure inside the delivery unit 30 and operating unit 50—i.e. in the infusion chamber—until it suffices for the water to filter through the pod. If, for instance, an espresso coffee pod is used, then the pressure of the water in the infusion chamber can rise up to 10-13 bar before any filtering takes place and the coffee is dispensed. On the other hand, if the pod being used is for an American-style coffee, then a pressure of 5-6 bar will suffice to have the beverage delivered because of the lesser consistency and compactness of the pod with respect to the previous example.

The operating unit 50 is sized so that the force exerted on the water heating and delivery unit 30 is sufficient to ensure a perfect closure of the infusion chamber and contain the thrust of the pressure inside the chamber. This pressure tends to open the infusion chamber, counteracted by the force of the piston, which is greater, the greater the pressure inside the chamber, which depends on the type of pod being used. Essentially, the machine is advantageously capable of independently adjusting the force of the piston as a function of the type of pod being used, thereby demonstrating a great operational flexibility.

After dispensing a beverage, the control unit 100 energizes the first solenoid valve 80, so that the water sent to the operating unit 50 is discharged into the water tank, while said unit 50 exploits its elastic return means to restore the delivery unit 30 to the resting position.

The end-of-stroke sensor records said return to the resting position and makes the microswitch 33 enable the geared motor 15, i.e. it induces a rotational movement of the revolving member 10. In the final stage of said rotation, the free end of the hook 20 harpoons the pod and discharges it advantageously into a tray included in the machine's frame and situated underneath the revolving member 10. After said rotation, the user can load a new pod and begin a new beverage dispensing cycle.

The technical solutions adopted in the machine for dispensing beverages enable the previously-established goals and objects to be fully met. In particular, the machine according to the invention ensures a reliable and repetitive unloading of the used pod thanks to the corresponding device made using a limited number of components. Moreover, the machine is extremely flexible in relation to the use of different types of pod thanks to its capacity to adjust independently to the working conditions, i.e. to vary the force exerted by the operating unit on the water heating and delivery unit to contain the pressure coming to bear inside the infusion chamber.

In practical terms, the materials adopted and the contingent shapes and sizes may vary according to need and the current state of the art.

I claim:

1. A machine for automatically preparing a beverage from a one-cup pod, comprising:
   a revolving member complete with a seat for containing said pod;
   a hook for retrieving said pod;
   a water heating and delivery unit comprising a one-way flow valve that opens when a certain pressure is exceeded;
   a unit for operating said water heating and delivery unit, wherein said revolving member:
   occupies a working position for preparing and dispensing said beverage, in which said water heating and delivery unit compresses said pod under the effect of said operating unit; and
   performs a revolving movement to discharge said pod, which is engaged on said hook,
   wherein said machine comprises a supporting frame having a first and a second shoulder suitable for supporting said revolving member, said hook, said water heating and delivery unit and said operating unit,
   and further wherein said hook comprises a harpoon spring connected to a first end on said first and/or said second supporting shoulder, said harpoon spring including a second, free end suitable for extending towards said revolving member to hook up said pod.

2. The machine of claim 1, wherein said seat for containing said pod is made in a flat part of said revolving member, said seat including a filter and a channel communicating between said seat and an external delivery spout.

3. The machine of claim 1, comprising a geared motor operationally connected to said revolving member, said geared motor being situated outside one of said supporting shoulders and inducing said rotational movement of said revolving member.

4. The machine of claim 1, wherein said operating unit comprises a piston contained inside a cylinder, said piston comprising at least one stem for driving said water heating and delivery unit from a first resting position to a second working position, said cylinder being supported by said first and/or said second supporting shoulder in a raised position with respect to said revolving member.

5. The machine of claim 4, wherein said piston is single-acting and includes elastic return means suitable for facilitating its return to said first resting position after dispensing said beverage.

6. The machine of claim 4, comprising a limit switch suitable for recording the return to said first resting position, said limit switch being operationally connected to a microswitch that is tripped to induce said rotational movement of said revolving member.

7. The machine of claim 4, wherein said water heating and delivery unit comprises a stably-coupled first heating part and a second delivery part, said first and second parts respectively forming a first bottom surface and a second top surface coming mutually into contact with each other, said first heating part being connected to said stem of said piston in said operating unit by a threaded male-female screw connection, and further wherein said machine comprises pumping means suitable for supplying water to said water heating and delivery unit and/or to said operating unit, said pumping means being operationally connected to a storage tank.

8. The machine of claim 7, wherein said second delivery part comprises a shaped base suitable for coming up against said flat portion in the vicinity of said seat when said revolving member occupies said working position, thereby creating an infusion chamber containing said pod.

9. The machine of claim 8, wherein said operating unit exerts a force on said water heating and delivery unit so as to counteract the pressure inside said infusion chamber.

10. The machine of claim 7, wherein said first heating part includes electric heating elements for heating the water, while said second delivery part comprises inlets for the water supplied by said pumping means, said second top surface of said second delivery part including a labyrinth of grooves connected to said water inlets.

11. The machine of claim 8, wherein said one-way flow valve includes a shutter supported by a first spring resting on a plate stably connected to said shaped base of said second delivery part, said shutter preventing the flow of water from said labyrinth of grooves to said pod when said one-way valve is closed, said plate comprising a number of openings suitable for enabling the flow of hot water towards said pod.

12. The machine of claim 7, wherein said second part includes a sealing ring suitable for coming into contact with the edges of said pod, compressing them hermetically.

13. The machine of claim 11, wherein said water heating and delivery unit includes a second spring for facilitating the detachment of said pod from said shaped base, said second spring being positioned in the vicinity of said shaped base so as to come into position between said plate and said pod when said beverage is prepared and dispensed.

14. The machine of claim 1, comprising a control unit for managing and programming the electronic components of the machine.

15. The machine of claim 5, comprising a first emptying solenoid valve suitable for enabling the discharge of the water sent by said pumping means to the operating unit, said control unit energizing said first solenoid valve when operating conditions previously established by a user are reached.

16. The machine of claim 7, comprising a flow meter with its inlet operationally connected to said storage tank and its outlet to said pumping means, said flow meter measuring the quantity of water handled by said pumping means.

17. The machine of claim 7, comprising a preheater with an inlet operationally connected to said pumping means and an outlet to said water heating and delivery unit.

18. The machine of claim 7, comprising a micropump suitable for drawing water from said tank to feed a steam generator.

19. The machine of claim 7, comprising an automatic device for connecting said tank to the main water supply, said automatic connection device including a second solenoid control valve operationally connected to the main water supply and a level sensor situated inside said tank, said sensor enabling said solenoid control valve whenever the level in said tank drops below or rises above a given minimum/maximum level.

20. The machine of claim 1, comprising a hot water tapping unit operationally connected to said water heating and delivery unit, said tapping unit drawing off hot water at a pressure substantially coinciding with the pressure that opens said one-way flow valve.

21. The machine of claim 1, comprising a collection tray for collecting the used pods, said collection tray being situated underneath said revolving member.

22. The machine of claim 1, comprising an outside containment casing.

\* \* \* \* \*